US007266345B2

(12) United States Patent
Park

(10) Patent No.: US 7,266,345 B2
(45) Date of Patent: Sep. 4, 2007

(54) SYSTEM AND METHOD FOR RECEIVING BROAD-BAND SIGNALS

(75) Inventor: Jeong-Ho Park, Seoul (KR)

(73) Assignee: LG Electronics Inc.

( * ) Notice: Subject to any disclaimer, the term of this patent is extended or adjusted under 35 U.S.C. 154(b) by 382 days.

(21) Appl. No.: 10/222,542

(22) Filed: Aug. 16, 2002

(65) Prior Publication Data

US 2003/0040282 A1    Feb. 27, 2003

(30) Foreign Application Priority Data

Aug. 21, 2001   (KR) ............................... 2001-50457

(51) Int. Cl.
*H04B 17/00* (2006.01)
*H04B 1/00* (2006.01)
*H04B 1/03* (2006.01)
(52) U.S. Cl. ................ 455/57.13; 455/63.3; 455/234.2
(58) Field of Classification Search ............... 455/63.1, 455/67.13, 67.11, 318, 333, 324, 323, 149, 455/313, 63.3, 234.2; 327/65
See application file for complete search history.

(56) References Cited

U.S. PATENT DOCUMENTS 6,317,064 B1 * 11/2001 Ferrer et al. ................ 341/118
6,321,073 B1 * 11/2001 Luz et al. ................ 455/239.1
6,516,185 B1 *  2/2003 MacNally ................ 455/234.1
6,272,350 B1 * 12/2003 Tekinay ....................... 455/506
6,665,526 B2 * 10/2004 Tsuji et al. ................... 455/296
6,804,826 B1 * 10/2004 Bush et al. .................. 725/107
6,823,181 B1 * 11/2004 Kohno et al. ............... 455/324
2003/0003889 A1 *  1/2003 Perets ......................... 455/266

* cited by examiner

*Primary Examiner*—Tilahun Gesesse
(74) *Attorney, Agent, or Firm*—Lee, Hong, Degerman, Kang & Schmadeka

(57) ABSTRACT

A system and a method for receiving and processing broadband signals in a software defined radio (SDR) terminal are provided. The system comprises first and second frequency pass units and an analog to digital signal converter (A/D converter). The first frequency pass unit converts an analog radio frequency (RF) signal into a direct current (DC) level signals and removes noise and DC components from the analog RF signal, if the RF signal is a high frequency signal. Otherwise, the second frequency pass unit removes noise and DC components from the analog RF signal, if the RF signal is a low frequency signal. The A/D converter converts the RF signal into a digital RF signal after the DC components are removed.

20 Claims, 4 Drawing Sheets

SYSTEM AND METHOD FOR RECEIVING BROAD-BAND SIGNALS

CROSS-REFERENCE TO RELATED APPLICATIONS

Pursuant to 35 U.S.C. §119(a), this application claims the benefit of earlier filing date and right of priority to the Korean Application No. 2001-50457, filed on Aug. 21, 2001, entitled "APPARATUS AND METHOD FOR RECEIVING BRAOD-BAND SIGNAL IN SDR TERMINAL" the content of which is hereby incorporated by reference herein in its entirety.

BACKGROUND OF THE INVENTION

1. Field of the Invention

The present invention relates to a mobile terminal and, particularly, to a system and a method for receiving a broad-band signal in a mobile terminal.

2. Description of the Background Art

A software defined radio (SDR) is a technology for realizing various functions in a mobile communication system by implementing software solutions for programmable hardware devices. Due to the analog communication technology being abandoned in favor of it's digital counterpart, SDR technology is becoming more popular and useful. The SDR technology accommodates various communication standards in one terminal. The SDR technology makes it possible for a wireless interface to be constructed by way of a software wirelessly downloadable to the mobile terminal. Various communication methods may be supported in real-time by request of a user or by a network manager in a single platform.

Furthermore, SDR uses programmable hardware in which most function blocks including the RF region are operated by software modules for controlling high speed processors. Therefore, a multiple radio access standard or service function can be supplied only by reprogramming the hardware instead of replacing it. In addition, when various mobile communication services are provided to a terminal or to a base station using the SDR, a user is provided with various communication services at a low cost regardless of local standard of the mobile communication system or the kind of service provided.

Further, a user may be provided with options for services suitable to the user's personal preferences. An SDR terminal may support discretionary radio communications and various protocols such as global system for mobile communication (GSM), code division multiple access (CDMA), time division multiple access (TDMA), and global positioning system (GPS).

FIG. 1 is a block diagram showing a signal receiving apparatus in a general SDR terminal. As shown, the signal receiving apparatus of a general SDR terminal comprises: an antenna 10 for receiving an analog radio frequency (RF) signal through a radio section; a send/receive signal processing unit 20 for dividing the analog RF signal into a high frequency analog RF signal and a low frequency analog RF signal, and generating a switch control signal; a first switch 30A and a second switch 30B controlled by the switch control signal transmitted from the send/receive signal processing unit 20; a high frequency pass unit 40 for converting the received high frequency analog RF signal into a high frequency digital RF signal; a low frequency pass unit 50 for converting the received low frequency analog RF signal into a low frequency digital RF signal; a digital signal processing unit 60 for processing the digital RF signal transmitted from the second switch 30B; and an input/output unit (I/O unit) 70 for providing the digital RF signal transmitted from the digital signal processing unit 60.

The high frequency pass unit 40 comprises: a high-pass filter (HPF) 41 for filtering the received high frequency analog RF signal to a baseband frequency; a low noise amplifier (LNA) 42 for amplifying the filtered high frequency analog RF signal in order to reduce noise factor of the entire receiver; and a high frequency A/D converter 43 for converting the amplified high frequency analog signal into a high frequency digital RF signal. The low frequency pass unit 50 comprises: a low-pass filter (LPF) 51 for filtering the received low frequency analog RF signal to a predetermined frequency band; a low noise amplifier 52 for amplifying the filtered low frequency analog RF signal in order to reduce the noise factor of the entire receiver; and an low frequency A/D converter 53 for converting the amplified low frequency analog RF signal into a low frequency digital RF signal.

FIG. 2 is a flow diagram illustrating a method of operation in the signal receiving apparatus of a general SDR terminal. Referring to FIGS. 1 and 2, at step S200, the antenna 10 receives an analog RF signal and transmits it-to the send/receive signal processing unit 20. The send/receive signal processing unit 20 determines the kind of signal and whether the received analog RF signal is a high or low frequency signal, at steps S210 and S220 respectively.

If the analog RF signal is a high frequency signal, the send/receive signal processing unit 20 generates a switch control signal for controlling the switch toward the high frequency pass unit 40, at step S230, and transmits the control signal to the first switch 30A and to the second switch 30B. Then the first switch 30A and the second switch 30B are controlled toward the high frequency pass unit 40, at step S240. Thereafter, the send/receive signal processing unit 20 transmits the high frequency analog RF signal to the high frequency pass unit 40.

The high frequency analog RF signal is fed to the high-pass filter 41. The high-pass filter 41 filters the received high frequency analog RF signal to a baseband frequency, and transmits the filtered high frequency analog RF signal to the low noise amplifier 42, at step S250, for amplification. The LNA 42 amplifies the high frequency analog RF signal in order to reduce the noise factor of the entire receiver, and transmits the amplified high frequency analog RF signal to the A/D converter 43. The high frequency A/D converter 43 converts the received high frequency analog RF signal into a low frequency digital RF signal, at step S260, and thereafter transmits the signal to the digital signal processing unit 60.

Referring back to step S220, if the received analog RF signal is a low frequency signal, then the send/receive signal processing unit 20 generates a switch control signal for controlling the switch toward the low frequency pass unit 45, at step S290. The control signal is provided to the first and second switches 30A and 30B, at step S300, to control the switch toward the low frequency pass unit. As such, the send/receive signal processing unit 20 transmits the low frequency analog RF signal to the low frequency pass unit 50.

The low frequency analog RF signal is then provided to the low pass filter (LPF) 51. The LPF 51 filters the low frequency analog RF signal to a baseband frequency, and transmits the filtered low frequency analog RF signal to the low noise amplifier (LNA) 52, at step S250, for amplification. The LNA 52 amplifies the low frequency analog RF signal in order to reduce the noise factor of the entire receiver, and transmits the amplified low frequency analog signal to the low frequency A/D converter 53. The low frequency A/D converter 53 converts the received low frequency analog RF signal into a low frequency digital RF signal, and transmits the signal to the digital signal processing unit 60 through the second switch 30B, at step S260.

Referring to FIG. 1, the digital signal processing unit 60 receives the high or low frequency digital RF signal and processes the digital RF signal, at step S270. The digital RF signal is then transmitted to the I/O unit 70. At step S280, the I/O unit 70 provides the digital RF signal as output.

As such, the signal receiving apparatus in a general SDR terminal converts an analog RF signal into a digital RF signal using two separate high and low frequency A/D converters 43 and 53, respectively. After the conversion then the digital signal is processed by digital signal processing unit 60. Therefore, the signal can be only converted and processed in a frequency range specific to the high and low A/D converters 43 and 53. Consequently, the operation frequency range in which the signal receiving apparatus in the SDR terminal can operate is limited.

SUMMARY OF THE INVENTION

The present invention is directed to a system and method for receiving a broad-band signal in a mobile terminal utilizing SDR technology. Additional advantages, objects, and features of the invention will be set forth in the description which follows and, in part, will become apparent to those having ordinary skill in the art upon examination of the following or from practice of the invention. The objectives and other advantages of the invention may be realized and attained by the structure particularly pointed out in the written description and claims hereof as well as the accompanying drawings.

A system for receiving broad-band signals in a software defined radio (SDR) terminal, according to one aspect of the invention, comprises: a first frequency pass unit, a second frequency pass unit, and an analog to digital signal converter (A/D converter). The first frequency pass unit converts an analog radio frequency (RF) signal into a direct current (DC) level signal and removes from the converted first analog RF signal a first DC component, if the analog RF signal is a high frequency signal. The second frequency pass unit removes a second DC component from the analog RF signal, if the analog RF signal is a low frequency signal. The analog to digital signal converter (A/D converter) converts the resultant analog RF signal into a digital RF signal.

The first and second frequency pass units may comprise DC signal removers for removing noise and DC components from the RF analog is signal. The first frequency pass unit may also comprise a mixer for converting a high frequency analog RF signal into a direct current level signal. According to one embodiment, the first frequency pass unit may comprise a high pass filter (HPF) for filtering a high frequency analog RF signal; a first low noise amplifier (LNA) for amplifying the high frequency analog RF signal; a mixer for converting the high frequency analog RF signal into a direct current (DC) level signal; and a first DC signal remover for removing noise and DC components from the high frequency analog RF signal.

In some embodiments, the second frequency pass unit may comprise a low pass filter (LPF) for filtering a low frequency analog RF signal; a second low noise amplifier (LNA) for amplifying the low frequency analog RF signal; and a second DC signal remover for removing noise and DC component from the low frequency analog RF signal. According to another embodiment of the invention, the system may further comprise a digital signal processing unit for processing the high and low frequency analog RF signals as well as an I/O unit for providing the processed high and low frequency signals.

A method of processing broad-band signals in a software defined radio SDR terminal, according to one aspect of the invention, comprises: receiving an analog RF signal; determining whether the analog RF signal is a high or low frequency signal; processing the analog RF signal in a high frequency pass unit, if the signal is a high frequency signal; processing the analog RF signal in a low frequency pass unit, if the signal is a low frequency signal; and providing an output analog RF signal.

In some embodiments, processing the analog RF signal in the high frequency pass unit may comprise: converting the analog RF signal into a DC level signal; and filtering the analog RF signal to remove one or more DC components and noise from the analog RF signal. Furthermore, processing the analog RF signal may also include: filtering the analog RF signal using a high or low pass filter; and amplifying the analog RF signal using a low noise amplifier (LNA). In accordance with a certain embodiment, noise and one or more DC components may be removed from the analog RF signal using a DC signal remover. The output analog RF signal is then converted into a digital RF signal using an A/D converter by way of a direct conversion method.

It is to be understood that both the foregoing summary and the following detailed description of the invention include exemplary embodiments that are intended to provide further explanation of the invention. The content and the embodiments included in the summary and other parts of the application, however, are provided by way of example and should not be construed to limit the scope of the invention as claimed.

BRIEF DESCRIPTION OF THE DRAWINGS

The accompanying drawings are included to provide a further understanding of the invention and are incorporated in and constitute a part of this specification. These drawings illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

Reference will now be made in detail to one or more embodiments of the invention, examples of which are illustrated in the accompanying drawings.

DETAILED DESCRIPTION OF THE PREFERRED EMBODIMENTS

Figure 1:
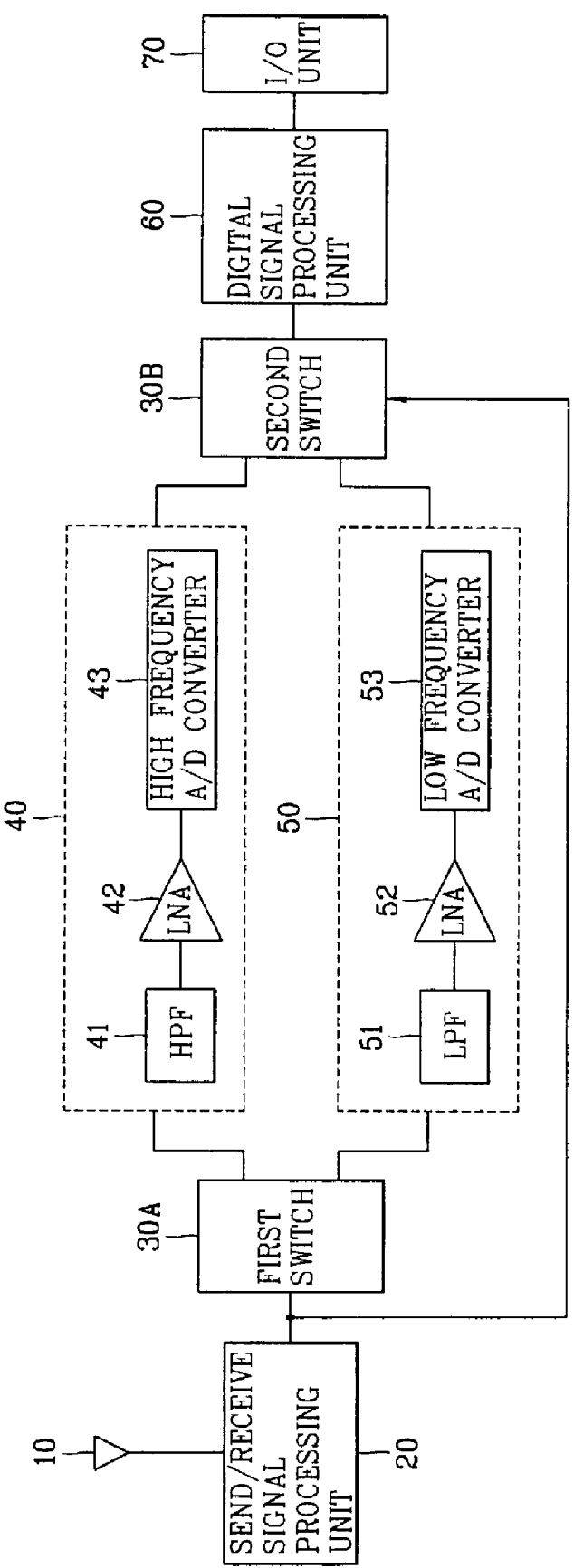
FIG. 1 is a block diagram illustrating a signal receiving apparatus in a general SDR terminal.
Figure 2:
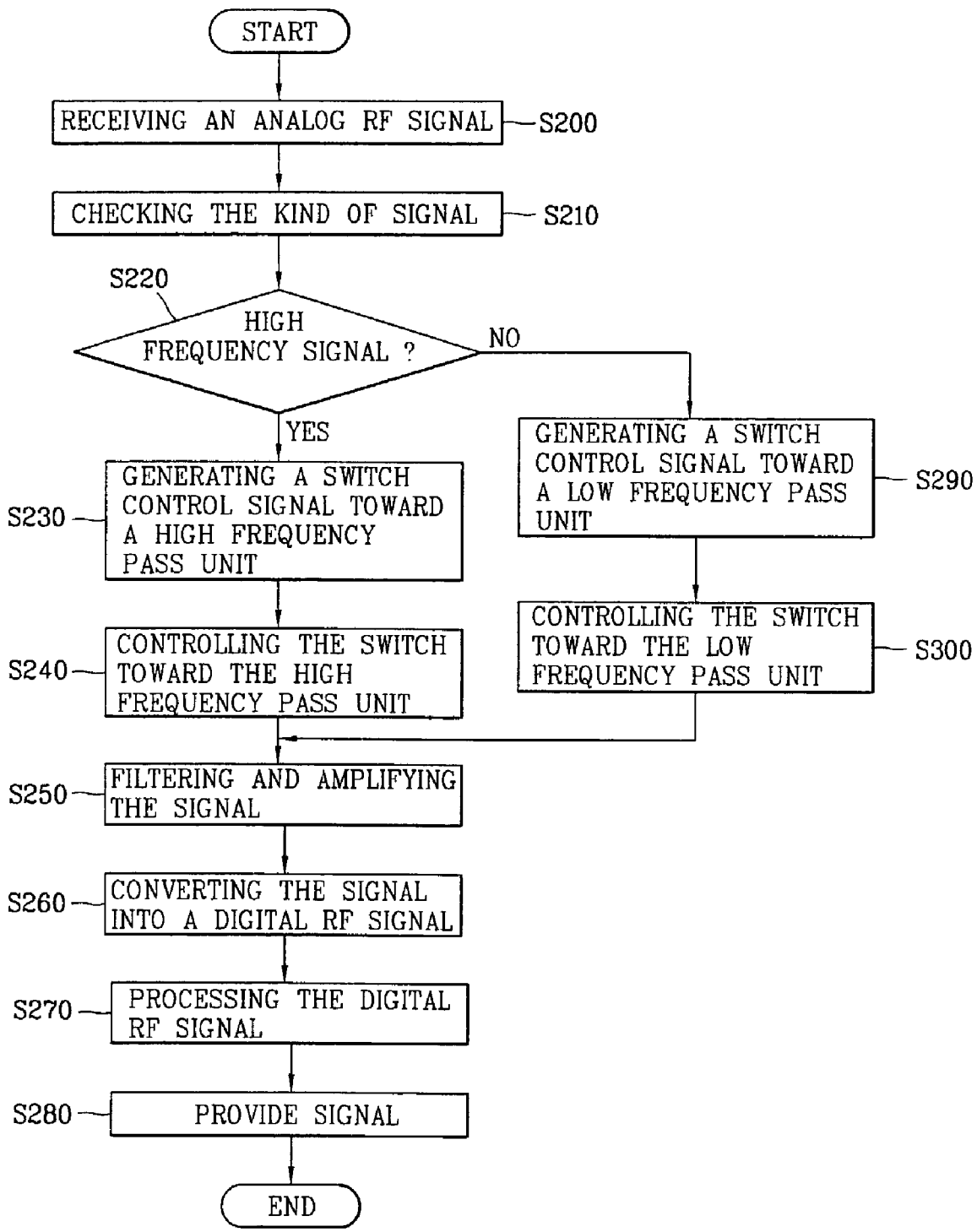
FIG. 2 is a flow chart illustrating a method of operation of the signal receiving apparatus of FIG. 1.
Figure 3:
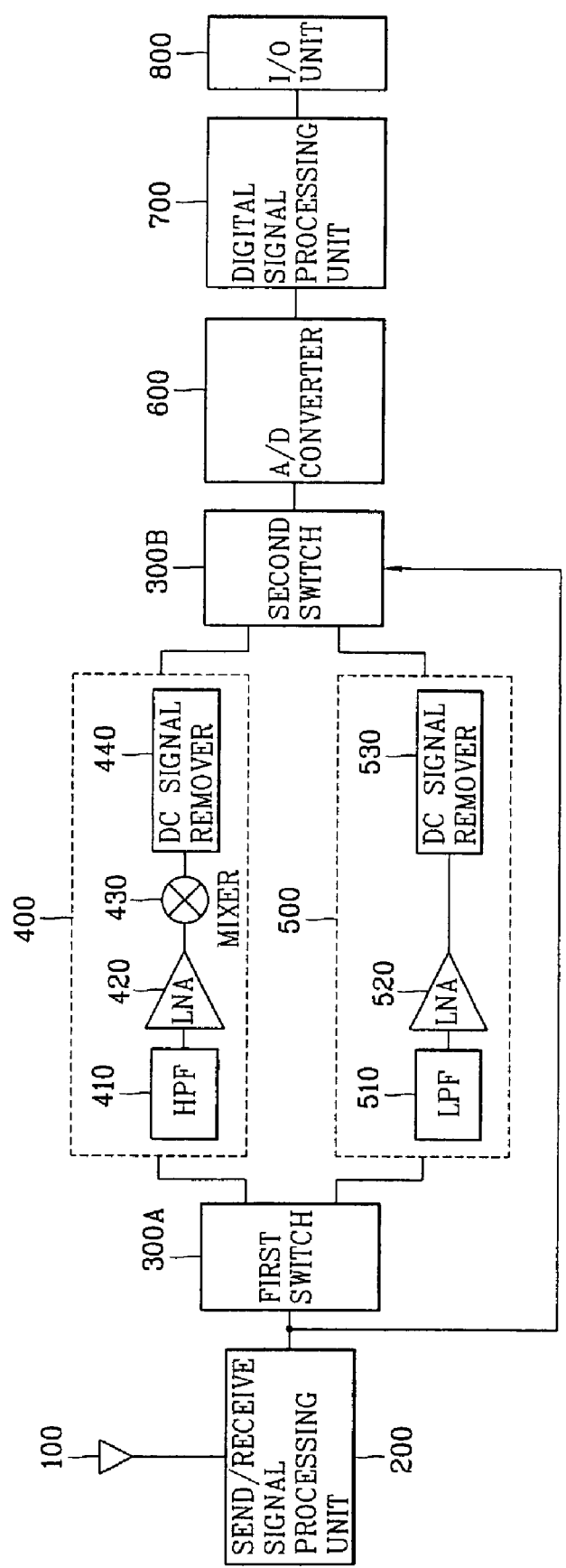
FIG. 3 is a block diagram showing an apparatus for receiving a broad-band signal according to one or more embodiments of the present invention.

Referring to FIG. 3, a system for receiving broad-band signal in the SDR terminal according to one aspect of the present invention comprises: an antenna 100 for receiving an analog radio frequency (RF) signal; a send/receive signal processing unit 200 for dividing the received analog RF signal into high frequency and low frequency analog RF signals, and generating a switch control signal. The system further comprises a first switch 300A and a second switch 300B controlled by the switch control signal generated by the send/receive signal processing unit 200; a high frequency pass unit 400 for converting a received high frequency analog RF signal into a DC level signal, and removing the DC component; and a low frequency pass unit 500 for filtering a received low frequency analog RF signal.

Certain embodiments of the system, further comprise an A/D converter 600 for converting the analog RF signal received through the second switch 300B into a digital RF signal; a digital signal processing unit 700 for processing the digital RF signal; and an input/output unit (I/O unit) 800 for providing the digital RF signal generated by the digital signal processing unit 700.

In some embodiments, the high frequency pass unit 400 comprises: a high-pass filter (HPF) 410 for filtering the received high frequency analog RF signal into a baseband frequency; a low noise amplifier (LNA) 420 for amplifying the filtered high frequency analog RF signal in order to reduce the noise factor of the entire receiver; a mixer 430 for converting the frequency level of the amplified high frequency analog RF signal into a direct current (DC); and a DC signal remover 430 for removing noise and the DC component of the high frequency analog RF signal passed through the LNA 420 and the mixer 430, respectively.

The low frequency analog RF signal, in accordance with one or more embodiments, comprises: a low-pass filter (LPF) 510 for filtering the received low frequency analog RF signal into a predetermined frequency band; a low noise amplifier (LNA) 520 for amplifying the filtered low frequency analog RF signal in order to reduce the noise factor of the entire receiver; and a DC signal remover 530 for removing the noise of the low frequency analog RF signal passed through the LNA 520.

Figure 4:
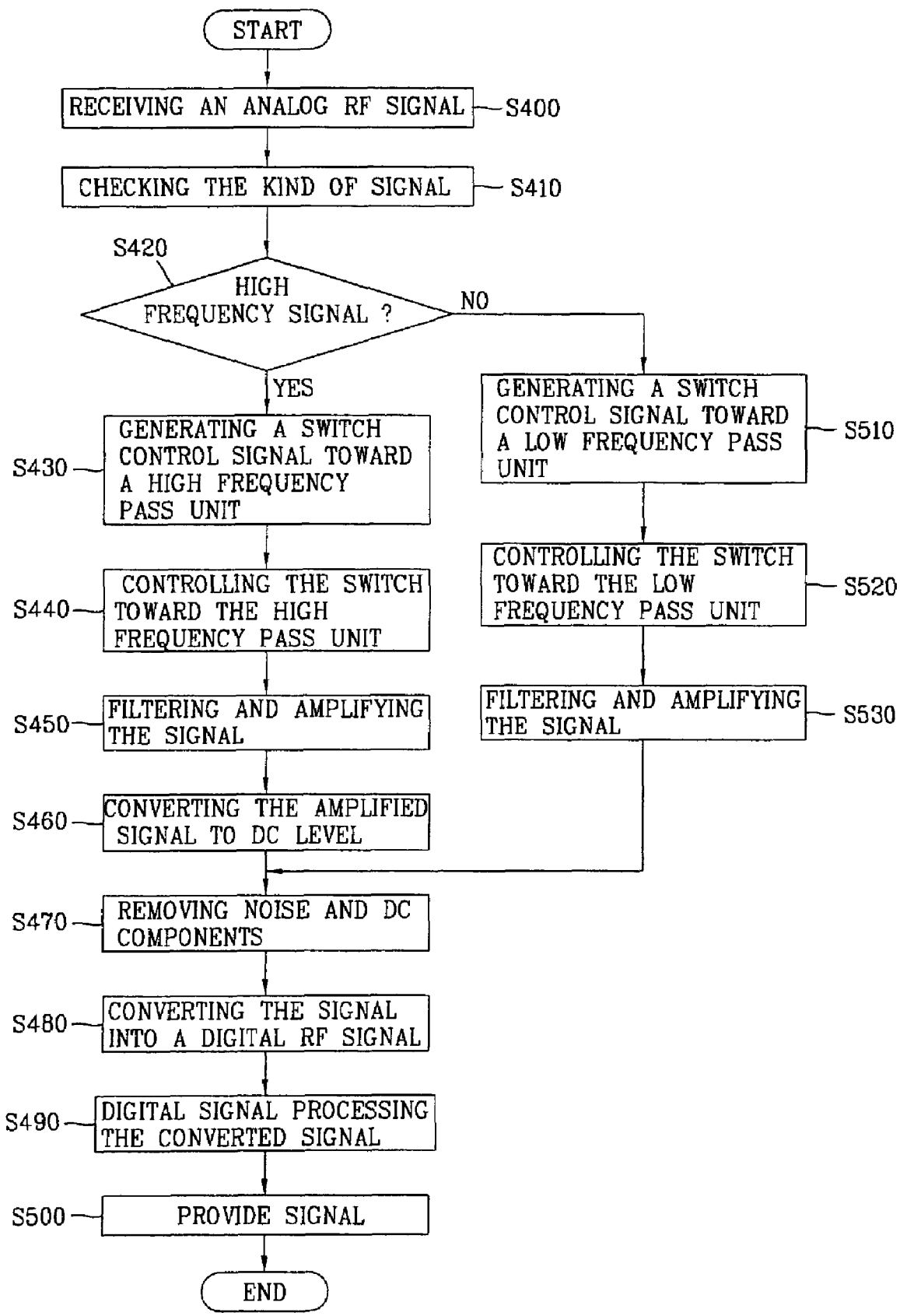
FIG. 4 is a flow diagram illustrating a method of operation of the apparatus of FIG. 3 according to one aspect of the present invention.

Referring to FIGS. 3 and 4, the process for transmitting an analog RF signal to the high frequency pass unit 400 or to the low frequency pass unit 500 from the antenna 100 in accordance with one or more embodiments is provided below. At state S400, an analog RF signal is received by the antenna 100. The analog RF signal is then transmitted to the send/receive signal processing unit 200, where it is checked, at states S410 and S420, as to whether the signal is high or low frequency. For high frequency signals, the send/receive signal processing unit 200 generates a switch control signal (at state S430) to control first and second switches 300A and 300B toward the high frequency pass unit 400, at state S440.

With respect to low frequency signals, the send/receive signal processing unit 200 generates a switch control signal (at state S510) to direct the first and second switches 300A and 300B toward the low frequency pass unit 500. Thereafter, the send/receive signal processing unit 200 transmits the control signal to first and second switches 300A and 300B, respectively, to control the switches toward the low frequency pass unit 500, at state S520.

In one or more embodiments, if the analog RF signal is a high frequency signal, then it is filtered and amplified by the high pass filter 410 and low noise amplifier 420, at state S450. If the analog RF signal is a low frequency signal, at state S530, the low frequency signal is filtered and amplified by the low pass filter 510 and low noise amplifier 520.

The LNA 420 of the high frequency pass unit 400 provides the amplified high frequency analog RF signal to the mixer 430. The mixer 430 converts the high frequency analog RF signal into a DC level current at state S460, and transmits the converted high frequency analog RF signal to the DC signal remover 440. At state S470, the DC signal remover 440 filters the noise and the DC components out of the high frequency analog RF signal to prevent the DC component from being inputted into the AND converter 600. Thereafter, the DC signal remover 440 transmits the filtered high frequency analog RF signal to the A/D converter 600 through the second switch 300B.

The LNA 520 of the low frequency pass unit 500 transmits the amplified low frequency analog RF signal to the DC signal remover 530. The DC signal remover 530 removes the noise and DC components included in the amplified low frequency analog RF signal, at state S470. After the noise and the DC component are removed in the low frequency analog RF signal, the DC signal remover 530 transmits the low frequency analog RF signal to the A/D converter 600 through the second switch 300B.

The A/D converter 600, after receiving the filtered high frequency or low frequency analog RF signal converts the analog RF signal into a digital RF signal, at state S480, and transmits the digital RF signal to the digital signal processing unit 700. The digital signal processing unit 700, at state S490, processes the received digital RF signal, and at state S500, provides the digital signal through I/O unit 800.

Accordingly, the system for receiving a broad-band signal in a SDR terminal according to one or more embodiments can filter a broad-band analog RF signal that can exceed the frequency range of a conventional device. The system removes the DC component in the analog RF signal and converts it into a digital RF signal using an A/D converter. As such, a broad-band signal can be received and processed into a digital signal in accordance with one or more embodiments of the invention.

Although particular embodiments of the invention have been shown and described, it will be apparent to those skilled in the art that changes and modifications may be made without departing from the invention in its broader aspects, and therefore, the appended claims are to encompass within their scope all such changes and modifications that fall within the true scope of the invention.

What is claimed is:

1. A system for receiving broad-band signals in a software defined radio (SDR) terminal, the system comprising:
   a signal processing unit for receiving the broad-band signal and generating a switch control signal, wherein the switch control signal is responsive to the broad-band signal frequency;
   a first frequency pass unit for converting an analog radio frequency (RF) signal into a direct current (DC) level signal, and for removing from said converted first analog RF signal a first DC component;
   a second frequency pass unit for removing a second DC component from the analog RF signal;
   a first switching means for connecting the signal processing unit to the first frequency pass unit or the second frequency pass unit responsive to the switch control signal;
   an analog to digital signal converter (A/D converter) for converting the analog RF signal into a digital RF signal; and a second switching means for connecting the first frequency pass unit or the second frequency pass unit to the A/D converter responsive to the switch control signal.

2. The system of claim 1, wherein the analog RF signal is a high frequency signal.

3. The system of claim 1, wherein the analog RF signal is a low frequency signal.

4. The system of claim 1, wherein said first and second frequency pass units each further comprise a DC signal remover for removing noise and DC components from said RF analog signal.

5. The system of claim 1 wherein said first frequency pass unit comprises a mixer for converting the analog RF signal into a direct current level signal, if the analog RF signal is a high frequency signal.

6. The system of claim 1, wherein the first frequency pass unit comprises:
   a high pass filter (HPF) for filtering a high frequency analog RF signal;
   a first low noise amplifier (LNA) for amplifying the high frequency analog RF signal;
   a mixer for converting the high frequency analog RF signal into a direct current (DC) level signal; and
   a first DC signal remover for removing noise and DC components from the high frequency analog RF signal.

7. The system of claim 1, wherein the second frequency pass unit comprises:
   a low pass filter (LPF) for filtering a low frequency analog RF signal;
   a second low noise amplifier (LNA) for amplifying the low frequency analog RF signal; and
   a second DC signal remover for removing noise and DC component from the low frequency analog RF signal.

8. The system of claim 1, wherein the first frequency pass unit comprises:
   a high pass filter (HPF) for filtering a high frequency analog RF signal;
   a first low noise amplifier (LNA) for amplifying the high frequency analog RF signal;
   a mixer for converting the high frequency analog RF signal into a direct current (DC) level signal; and
   a first DC signal remover for removing noise and DC components from the high frequency analog RF signal; and,
   wherein the second frequency pass unit comprises:
      a low pass filter (LPF) for filtering a low frequency analog RF signal;
      a second low noise amplifier (LNA) for amplifying the low frequency analog RF signal; and
      a second DC signal remover for removing noise and DC component from the low frequency analog RF signal.

9. The system of claim 8, further comprising an A/D converter for converting the analog RF signal to a digital signal.

10. The system of claim 9, further comprising a digital signal processing unit for processing the digital signal.

11. A method of processing broad-band signals in a software defined radio SDR terminal, the method comprising:
   receiving an analog RF signal;
   determining whether the analog RF signal is a high or low frequency signal;
   generating a switch control signal responsive to whether the analog RF signal is a high or low frequency signal;
   switching the analog RF signal to a high frequency pass unit or a low frequency pass unit for processing depending upon the switch control signal, wherein the high frequency pass unit generates a high frequency RF signal and the low frequency pass unit generates a low frequency RF signal; and
   switching either the high frequency RF signal or the low frequency RF signal according to the switch control signal to an A/D converter,
   wherein processing the analog RF signal in the low frequency pass unit comprises filtering the low frequency analog RF signal to remove one or more DC components and noise from the low frequency analog RF signal.

12. The method of claim 11, wherein processing the analog RF signal in the high frequency pass unit comprises:
   converting the high frequency analog RF signal into a DC level signal; and
   filtering the analog RF signal to remove one or more DC components and noise from the high frequency analog RF signal.

13. The method of claim 12, wherein processing the analog RF signal in the high frequency pass unit further comprises:
   filtering the high frequency analog RF signal using a high pass filter (HPF); and
   amplifying the high frequency analog RF signal using a low noise amplifier (LNA).

14. The method of claim 13, wherein the noise and the one or more DC components are removed from the high frequency analog RF signal using a DC signal remover.

15. The method of claim 12, wherein the high frequency analog RF signal is converted into the DC level signal using a mixer.

16. The method of claim 12, wherein processing the analog RF signal in the low frequency pass unit further comprises:
   filtering the low frequency analog RF signal using a low pass filter (LPF); and
   amplifying the low frequency analog RF signal using a low noise amplifier (LNA).

17. The method of claim 11, further comprising:
   converting at least one of the high and low frequency analog RF signals into a digital RF signal using the A/D converter.

18. The method of claim 17, wherein at least one of the high and low frequency analog RF signals is converted into the digital RF signal using a direct conversion method.

19. The method of claim 11, wherein the noise and the one or more DC components are removed from the low frequency analog RF signal using a DC signal remover.

20. A method of processing broad-band signals in a software defined radio SDR terminal, the method comprising:
   receiving an analog RF signal;
   determining whether the analog RF signal is a high or low frequency signal;
   generating a switch control signal responsive to whether the analog RF signal is a high or low frequency signal;
   switching the analog RF signal to a high frequency pass unit or a low frequency pass unit for processing depending upon the switch control signal, wherein the high frequency pass unit generates a high frequency RF signal and the low frequency pass unit generates a low frequency RF signal; and switching either the high frequency RF signal or the low frequency RF signal according to the switch control signal to an A/D converter, wherein processing the analog RF signal in the high frequency pass unit comprises converting the high frequency analog RF signal into a DC level signal and filtering the analog RF signal to remove one or more DC components and noise from the high frequency analog RF signal.

\* \* \* \* \*